United States Patent
Wu

(10) Patent No.: US 6,338,524 B1
(45) Date of Patent: Jan. 15, 2002

(54) AUTOMOTIVE AERODYNAMIC COMPONENT AND OBJECT CARRIER FIXTURE

(76) Inventor: Shiang-Huei Wu, No.343,,Sec.1,Chung-Shan Road, Chang-Hua City (TW)

( * ) Notice: Subject to any disclaimer, the term of this patent is extended or adjusted under 35 U.S.C. 154(b) by 0 days.

(21) Appl. No.: 09/563,746

(22) Filed: May 4, 2000

(51) Int. Cl.$^7$ ............... B62D 37/02; B60J 7/22; B60R 9/05; B60R 9/045
(52) U.S. Cl. ............... 296/180.1; 296/180.3; 296/180.5; 180/903; 224/316; 224/320; 224/325
(58) Field of Search ............... 296/180.1, 180.5, 296/180.2, 180.3; 180/903; 224/314, 316, 318, 320, 321, 324, 325, 309, 326

(56) References Cited

U.S. PATENT DOCUMENTS

| | | | | |
|---|---|---|---|---|
| 3,000,663 A | * | 9/1961 | Lucchesi | 296/180.5 |
| 3,596,974 A | * | 8/1971 | Adams | 296/180.2 |
| 3,724,577 A | * | 4/1973 | Ferino | 180/903 |
| 3,894,764 A | * | 7/1975 | Powell | 296/180.5 |
| 3,929,369 A | * | 12/1975 | Blair | 296/180.3 |
| 4,026,595 A | * | 5/1977 | Jacks | 296/180.3 |
| 4,079,984 A | * | 3/1978 | Powell | 296/180.3 |
| 4,084,846 A | * | 4/1978 | Wiley, Jr. et al. | 296/180.3 |
| 4,264,099 A | * | 4/1981 | Pierce | 296/180.2 |
| 4,558,898 A | * | 12/1985 | Deaver | 296/180.1 |
| 4,629,240 A | * | 12/1986 | Donier | 296/180.5 |
| 4,849,220 A | * | 6/1988 | Adams et al. | 296/180.3 |
| 4,826,061 A | * | 5/1989 | Heideman | 224/321 |
| 4,867,397 A | * | 9/1989 | Pamadi et al. | 296/180.1 |
| 5,061,007 A | * | 10/1991 | Simpson | 296/180.5 |
| 5,184,866 A | * | 2/1993 | Dresen et al. | 296/180.1 |
| 5,236,242 A | * | 8/1993 | Seeman | 296/180.1 |
| 5,474,218 A | * | 12/1995 | Arsenault, Jr. et al. | 296/180.1 |
| 5,769,292 A | * | 6/1998 | Cucheran et al. | 224/324 |
| 5,884,824 A | * | 3/1999 | Spring, Jr. | 224/321 |

FOREIGN PATENT DOCUMENTS

| | | | | |
|---|---|---|---|---|
| CA | 0905456 | * | 7/1972 | 296/180.3 |
| FR | 2497753 | * | 7/1982 | 296/180.3 |
| FR | 2687616 A1 | * | 8/1993 | 180/903 |
| SU | 0885091 | * | 12/1981 | 296/180.2 |

* cited by examiner

Primary Examiner—Stephen T. Gordon
Assistant Examiner—Hilary Gutman
(74) Attorney, Agent, or Firm—Troxell Law Office PLLC

(57) ABSTRACT

An automotive aerodynamic component and object carrier fixture is installed on the top of an automobile with an inclination adjustable according to the handling style of the driver. During normal utilization, the aerodynamic component is mounted level to provide a low air resistance. When the aerodynamic component is adjusted such that it is mounted at a forward inclination, downward pressure is generated which increases the weight of the vehicle to increase tracking over the ground. When the aerodynamic component is adjusted such that it is mounted at an upward inclination, a lifting force is generated that decreases the weight of the vehicle to achieve lower fuel consumption, faster acceleration, and more responsive braking performance. A vertical wing is provided to increase directional stability.

1 Claim, 6 Drawing Sheets

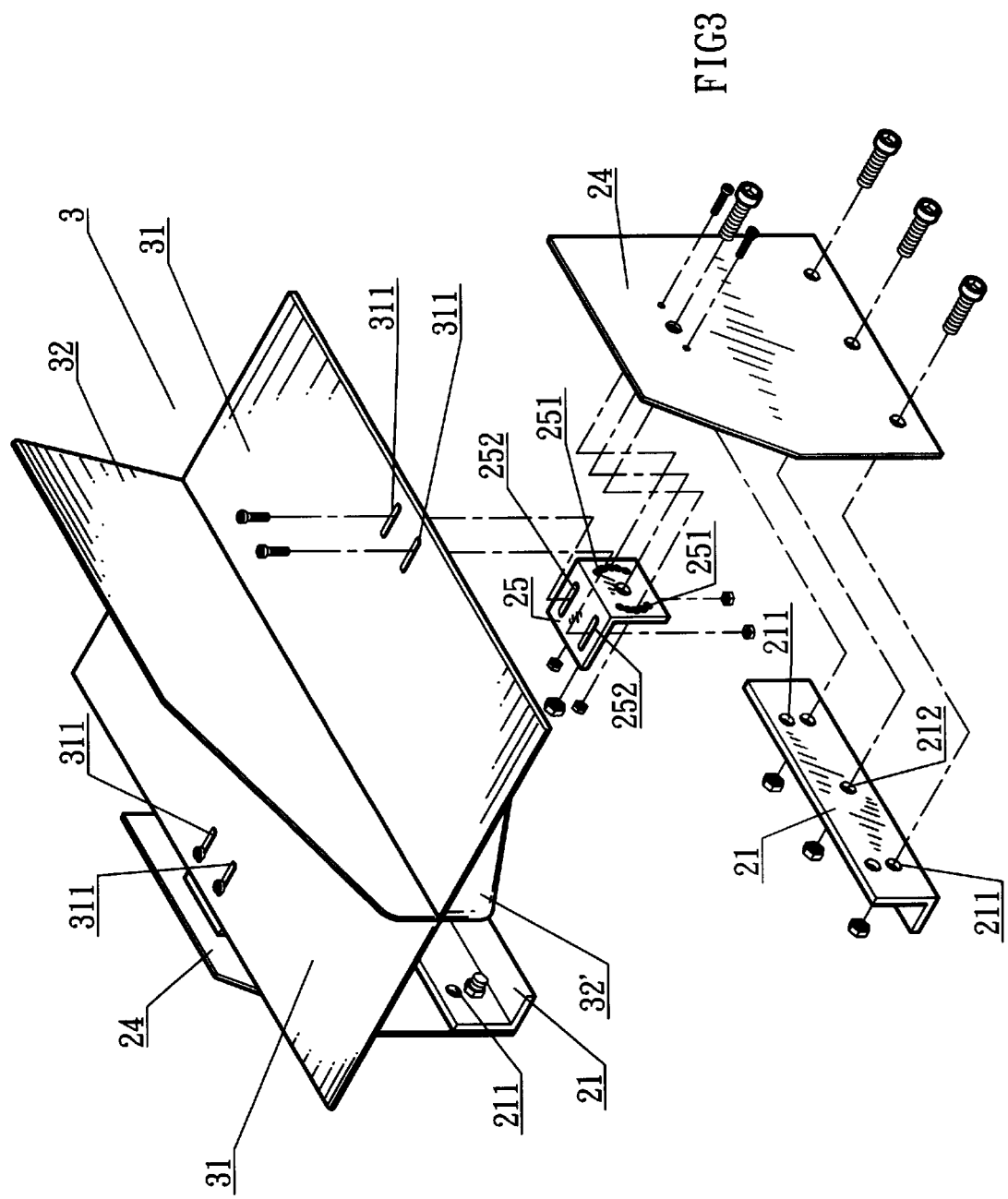

AUTOMOTIVE AERODYNAMIC COMPONENT AND OBJECT CARRIER FIXTURE

BACKGROUND OF THE INVENTION

1) Field of The Invention

The invention herein relates to an automotive aerodynamic component and object carrier fixture comprised of an object carrier fixture installed on the top of an automobile that is equipped with an interchangeably mounted and adjustable aerodynamic component as an option. During normal utilization, the aerodynamic component is mounted level to provide low air resistance. When the aerodynamic component is adjusted such that it is mounted at a forward inclination, downward pressure is generated which increases the weight of the vehicle by enabling the coefficient of air resistance to slightly increase drag and thereby increase tracking over the ground. When the aerodynamic component is adjusted such that it is mounted at an upward inclination, a lifting force is generated that decreases the weight of the vehicle to achieve lower fuel consumption, faster acceleration, and more responsive braking performance. A vertical wing is disposed on the center sections along both the upper and lower surfaces of a horizontal wing such that while moving against the air, they provide vertical guidance relative to the air flow traveling past them, thereby effectively achieving increased vehicle body directional stability, which is among the innovative features of the present invention.

2) Description of The Prior Art

To increase vehicle stability while being driven at high speeds, conventional automobiles (such as sports cars and sport sedans) are optionally equipped with spoiler panels (commonly referred to as tail wing and depicted in FIG. 1) at the rear end (over the trunk). While many types are available, the majority are fixed (the angle of incidence of the said spoiler panel is permanent), but a few are active units that allow upward or downward angular adjustment for road conditions and user requirements. However, the special characteristics of such spoiler panels installed at the rear end of automobiles is mainly the deflecting of air flow near the aft aspect of the vehicle to achieve downward pressure and thereby invisibly increase overall chassis weight. However, actual wind tunnel tests indicate that the force applied by a spoiler panel is totally concentrated at the point of installation on the rear section of a car such that when vehicle speed is gradually increased (wherein the applied force is increased in progressive increments), the force of additional weight generated by the said spoiler panel at that position causes the rear wheel to function as a fulcrum, with the resultant downward application of force elevating the front end of the vehicle.

Simply stated, when additional weight is applied to the rear of the vehicle, the rear wheels of the chassis become the support point of downward leverage that causes the front end of the vehicle body to float in a direction opposite from initial vector of force.

As a result, the existent irrationalities and unacceptable shortcomings of the said conventional spoiler panels motivated the inventor of the invention herein to focus on further development and extensive detailed analysis based on many years of specialized experience gained while engaged in the relevant specialized technology and finally culminated in the content of the invention herein, which in accordance with the patent law is hereby submitted in application for the commensurate patent rights.

SUMMARY OF THE INVENTION

The primary objective of the invention is to provide an automotive aerodynamic component and object carrier fixture comprises of an object carrier fixture installed on the top of an automobile that is equipped with an interchangeably mounted aerodynamic component adjustable to level, forward and upward inclinations. During normal utilization, the aerodynamic component is mounted level to provide low air resistance. When the aerodynamic component is adjusted such that it is mounted at a forward inclination, downward pressure is generated which increases the weight of the vehicle by enabling the coefficient of air resistance to slightly increase drag and thereby increase tracking over the ground. When the aerodynamic component is adjusted such that it is mounted at an upward inclination, a lifting force is generated that decreases the weight of the vehicle to achieve lower fuel consumption, faster acceleration, and more responsive braking performance.

Another objective of the invention herein is to provide an automotive aerodynamic component and object carrier fixture that is installed at a predetermined area of a car top with the aerodynamic component mounted thereon such that the force generated by the fixed wing is applied to the center section of the vehicle body, such that the resultant force of downward pressure is equally distributed onto both the front and rear wheels, thereby simultaneously augmenting wheel-to-ground tracking stability so that hazardous situations such as the front wheel float and wobble (which occurs when weight is shifted to the rear end of chassis) as well as vehicle rear end bottoming does not occur. As such, handling is safer and obviously enhanced when a vehicle so equipped is driven at high speed.

Yet another objective of the invention herein is to provide an automotive aerodynamic component and object carrier fixture in which a vertical wing is disposed on the center sections of both the upper and lower surfaces, respectively, of a horizontal wing such that while moving against the air, they provide vertical guidance relative to the air flow traveling past the horizontal wing so that vehicle body deflection to the left and right does not occur, thereby effectively achieving a tangible increase in directional stability, which is among the innovative features of the present invention.

Still another objective of the invention herein is to provide an automotive aerodynamic component and object carrier fixture fabricated of a non-corroding material, with the object carrier fixture capable of being normally utilized alone as a handy lightweight tie-down rack for articles (such as camping equipment, etc.) to thereby provide for greater overall practical application.

To enable a further understanding of the structural features, operation, and other related items of the invention herein for purposes of review and reference, the brief description of the drawings below is followed by the detailed description of the invention.

BRIEF DESCRIPTION OF THE DRAWINGS

FIG. 2-A is an isometric drawing of the assembled object carrier fixture of the invention herein.

FIG. 3-A is an isometric drawing of the aerodynamic component of the invention herein.

DETAILED DESCRIPTION OF THE INVENTION

Figure 2:
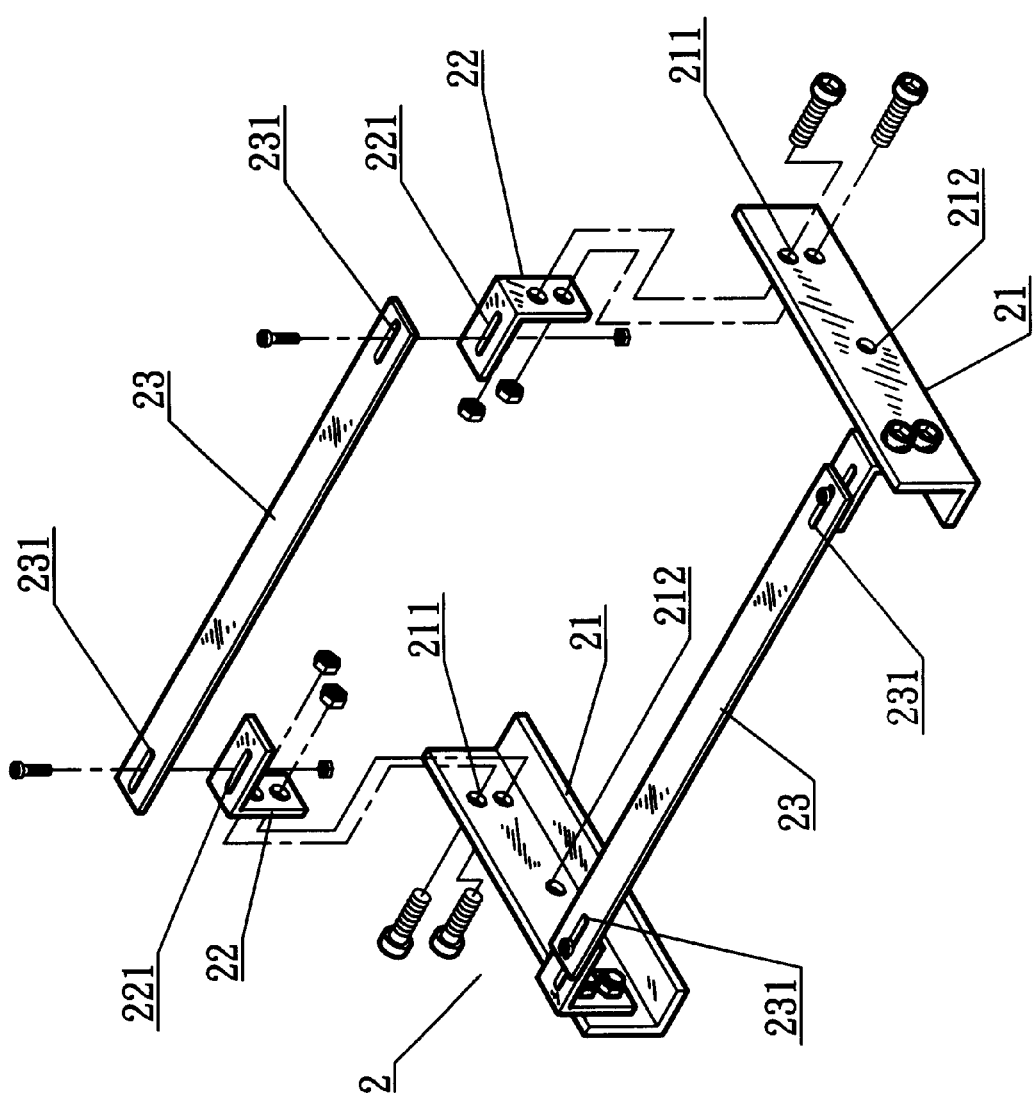
FIG. 2 is an exploded isometric drawing of the object carrier fixture of the present invention.
Figure 2A:
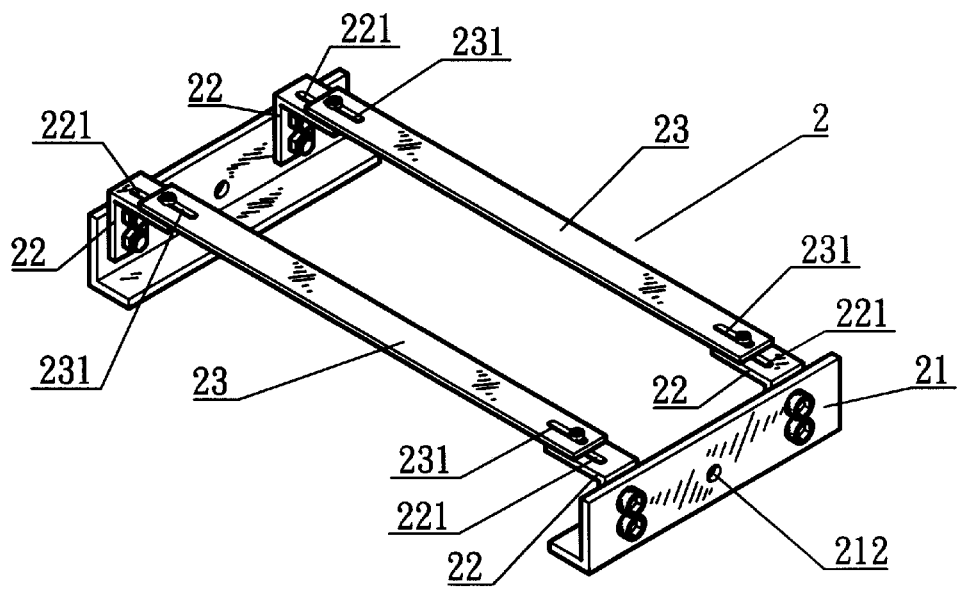
Figure 3A:
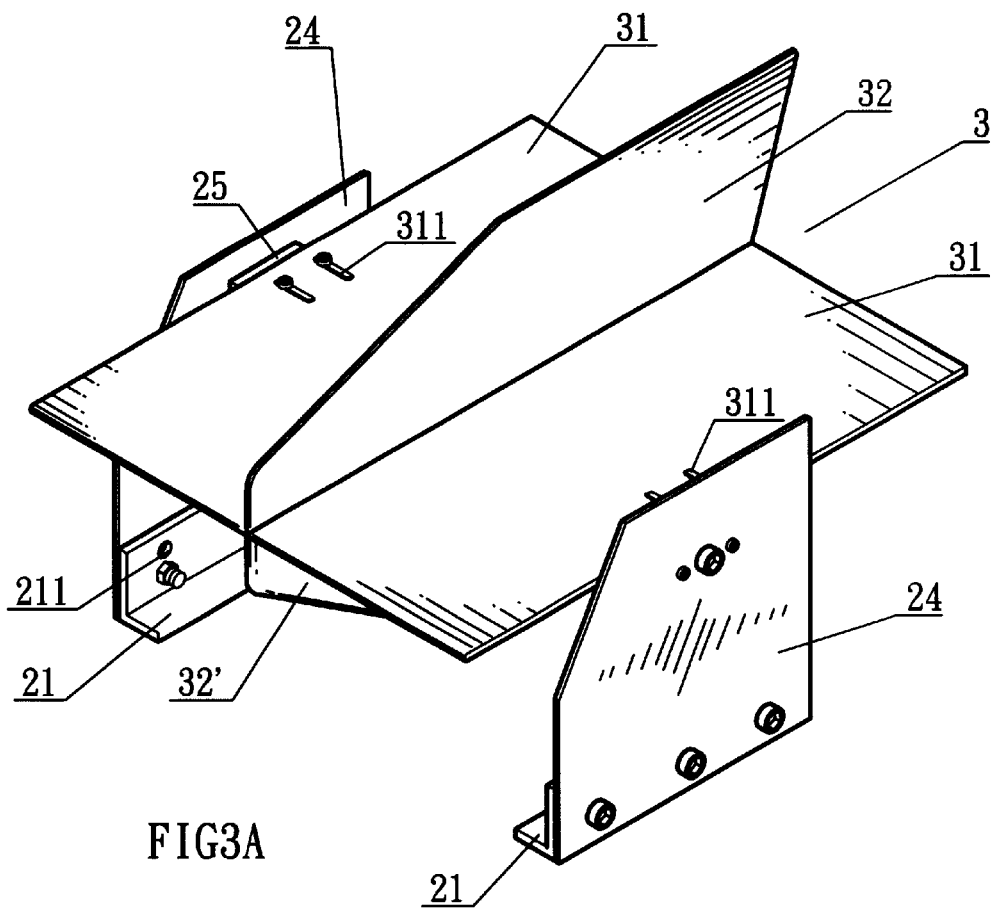
FIG. 3 is an exploded drawing of the aerodynamic component of the invention herein.

Referring to FIG. 2 (including FIG. 2-A) and FIG. 3 (including FIG. 3-A), the structure of the invention herein is comprised of an object carrier fixture 2 installed on the top of an automobile and, furthermore, an aerodynamic component 3 that can be interchangeably mounted onto the object carrier fixture 2, with the forward and upward inclination of the said aerodynamic component 3 adjustable according to the driving style of the driver. The object carrier fixture 2 and aerodynamic component 3 are best fabricated of a non-corroding material.

The object carrier fixture 2 consists of two lengthwise members 21 that are directly affixed (for example, by welding) to a predetermined position on a car top, with a plurality of fastener holes 211 in the tail section of the lengthwise members 21. Each of the fastener holes 211 provide for the screw fastening of locating blocks 22, providing for the securing of a crosswise member 23. The design also includes elongated holes 221 and 231 formed at each securing point of the locating block 22 and crosswise member 23, respectively, to provide for installation to different model automobiles. Normally the object carrier fixture 2 additionally serves as a handy lightweight tie-down rack for objects (as shown in FIG. 2 and FIG. 2-A).

In addition, an upright plate 24 can be secured to through-holes 212 at predetermined locations in the lengthwise members 21. An adjustment block 25 is screw fastened to the upright plate 24, with the adjustment block 25 having a plurality of angle adjustment holes 251 in its vertical surface, to provide for adjustment to different angles, as well as an elongated hole 252 in its horizontal surface to provide for mounting the aerodynamic component 3. The aerodynamic component 3 has elongated holes 311 in the lateral periphery of its horizontal wing 31 providing for adjustment and fastening. Vertical wings 32 and 32' are disposed on the upper and lower surfaces, respectively, of the horizontal wing 31 such that when the invention herein is not being utilized as an object carrier, its aerodynamic component capability can be set up to assist driving conditions (as shown in FIG. 3 and FIG. 3-A).

Figure 5:
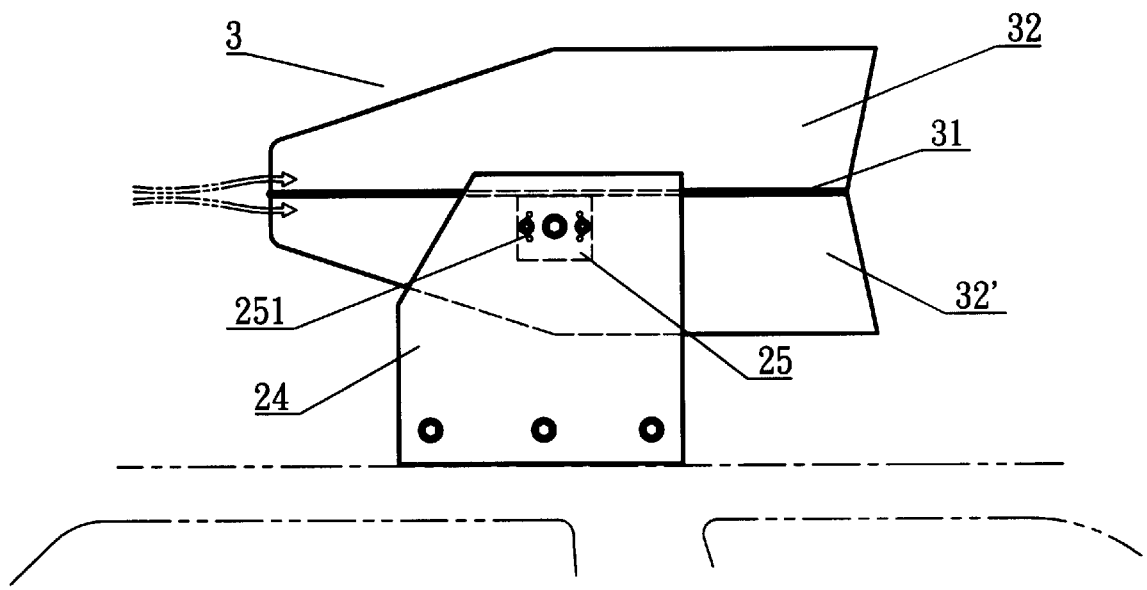
FIG. 5 is an orthographic drawing of the aerodynamic component of the invention herein as adjusted to a level position.
Figure 6:
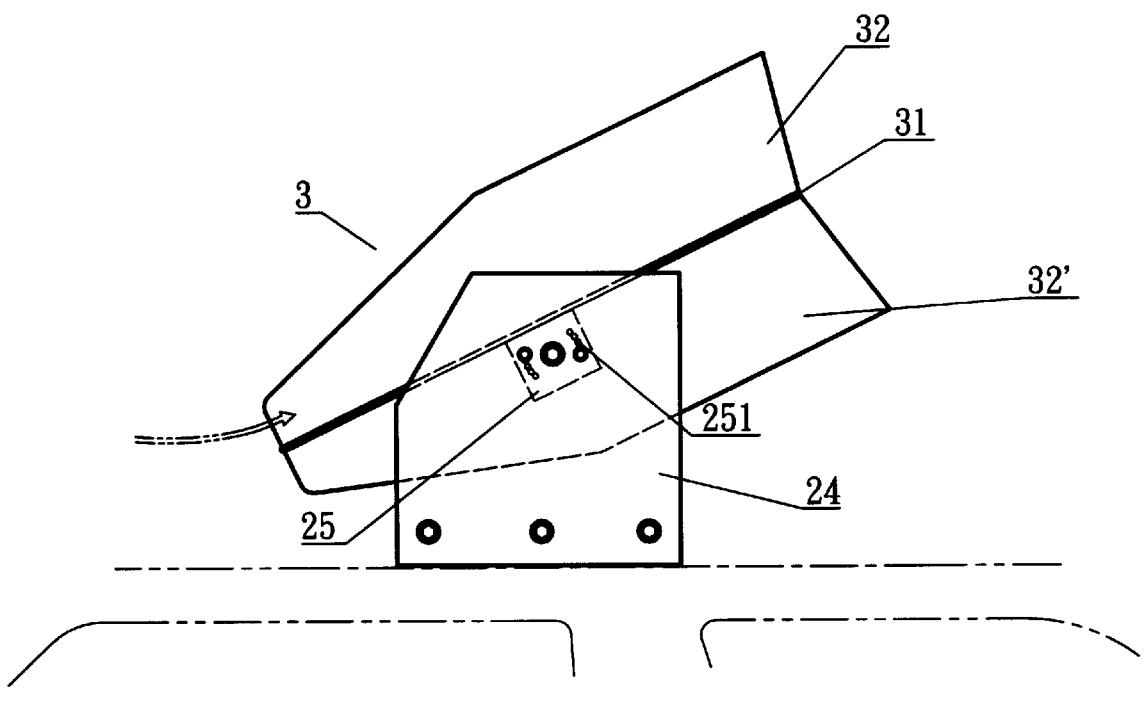
FIG. 6 is an orthographic drawing of the aerodynamic component of the invention herein as adjusted to forward inclination.
Figure 7:
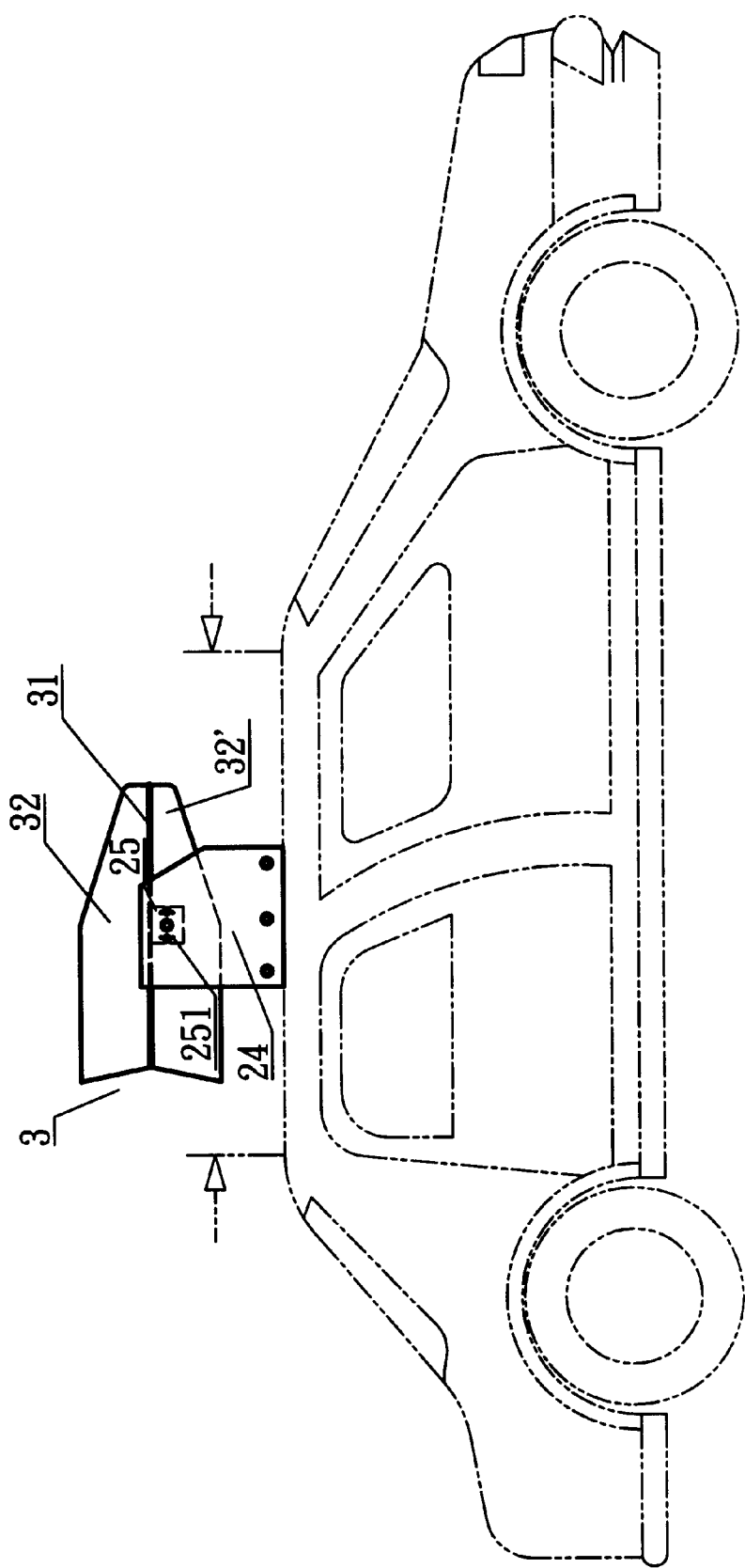
FIG. 7 is an orthographic drawing of the invention installed on a vehicle.

During normal utilization, the aerodynamic component 3 is mounted level (as shown in FIG. 5) to provide a low air resistance wing having a perpendicular angle of incidence. However, when the aerodynamic component 3 is adjusted such that it is mounted at a forward inclination (as shown in FIG. 6), downward pressure is generated which increases the weight of the vehicle (as indicated by the arrowhead of FIG. 6) by enabling the coefficient of air resistance to slightly increase drag and thereby increasing tracking over the ground.

Figure 4:
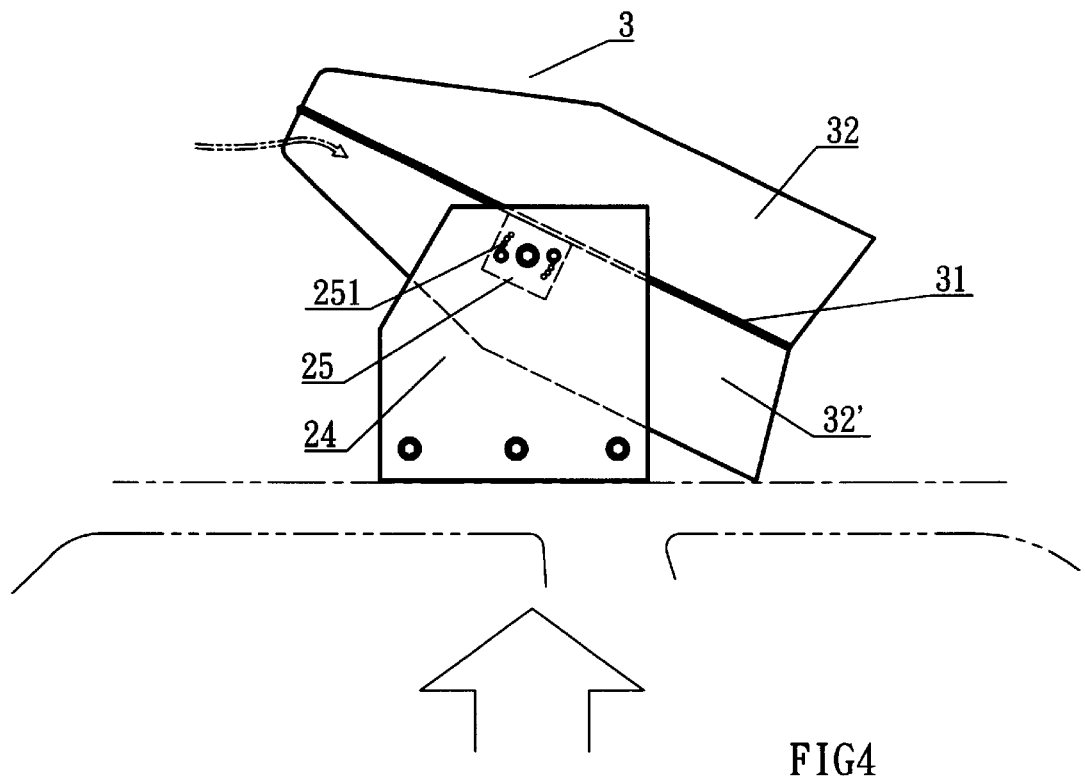
FIG. 4 is an orthographic drawing of the aerodynamic component of the invention herein as adjusted to an upward inclination.
Figure 1:
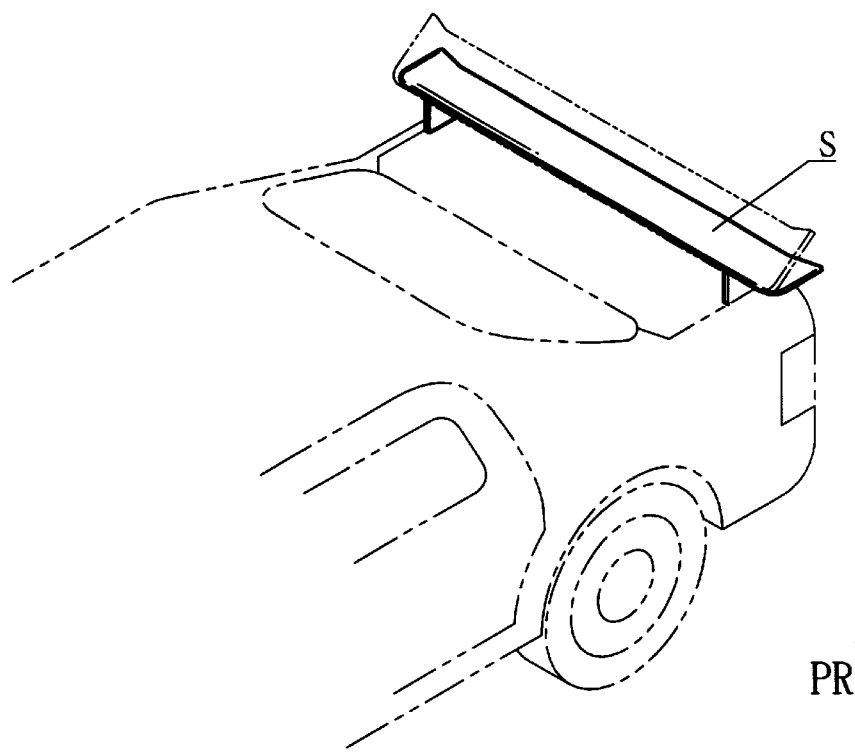
FIG. 1 is an isometric drawing of a conventional assembly and installation.

When the aerodynamic component 3 is adjusted at an upward inclination (as shown in FIG. 4), a lifting force is generated that decreases the weight of the vehicle (as indicated by the arrowhead of FIG. 4) to achieve lower fuel consumption and better acceleration performance, though safe limited speeds should be observed on high speed roadways. the vertical wings 32 and 32' are disposed along the center sections on the upper and lower surfaces, respectively, of the horizontal wing 31 such that while moving against the air, they provide vertical guidance relative to the air flow traveling past the horizontal wing 31 so that vehicle body deflection to the left and right does not occur, thereby effectively achieving a tangible increase in directional stability.

What is claimed is:

1. A combination aerodynamic component and object carrier for a vehicle comprising:
    a) first and second spaced apart members configured to be mounted on an upper surface of the vehicle;
    b) at least two cross members, each removably attached to and extending between the first and second spaced apart members;
    c) an upright plate removably attached to each of the first and second spaced apart members so as to extend upwardly therefrom;
    d) a horizontal wing located between the upright plates, the horizontal wing having upper and lower surfaces and further comprising vertical wings extending from the upper and lower surfaces of the horizontal wings; and,
    e) adjustment blocks attached to the horizontal wing, the adjustment blocks having a plurality of adjustment holes and being adjustably connected to the upright plates such that an angle of the horizontal wing can be adjusted between forward inclination, level and rearward inclination positions.

* * * * *